Figure 1:
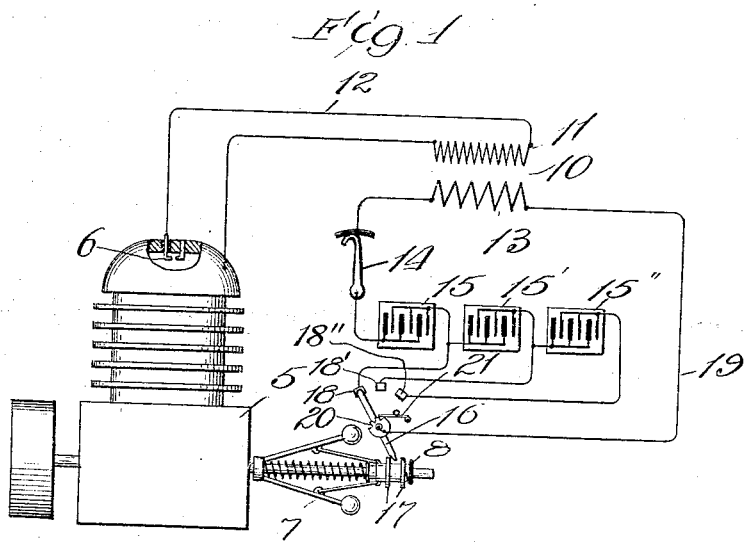

C. B. ASKEW.
IGNITION SYSTEM FOR INTERNAL COMBUSTION ENGINES.
APPLICATION FILED NOV. 14, 1907.

941,124.

Patented Nov. 23, 1909.

Witnesses
Ray White
Harry R. L. White

Inventor
Charles B. Askew
By Forée Bain and May, Attys

UNITED STATES PATENT OFFICE.

CHARLES B. ASKEW, OF CHICAGO, ILLINOIS.

IGNITION SYSTEM FOR INTERNAL-COMBUSTION ENGINES.

941,124.      Specification of Letters Patent.      Patented Nov. 23, 1909.

Application filed November 14, 1907. Serial No. 402,064.

*To all whom it may concern:*

Be it known that I, CHARLES B. ASKEW, a citizen of the United States, residing at Chicago, in the county of Cook and State of Illinois, have invented certain new and useful Improvements in Ignition Systems for Internal-Combustion Engines, of which the following is a specification.

My invention relates to improvements in ignition systems for internal combustion engines, and has for its general object to provide an ignition system which will automatically accommodate itself to variations in speed of the engine throughout a range much greater than that in which the usual ignition system is effective.

I have found that in the operation of the usual ignition system the time moment under some conditions becomes the dominant and limiting factor; that is to say, recognizing the fact that as the R. P. M. increases the duration of the spark producing condition in the ignition system decreases proportionately, it is clear that at some speed a critical point is reached at which the duration of the spark producing condition is insufficient to permit of the electrical action necessary to produce the spark effectively, under the normal condition of current value in the ignition supply circuit. Such speed, therefore, becomes a maximum or limitation speed of the engine under such condition in the ignition circuit.

It is a customary and advantageous practice in the provision of ignition systems to provide the current carrying devices or translating devices of the system, of suitable structure and proportion to suit the current value predetermined for normal operation of the ignition system, and such provision I retain. I have found, however, that under the high speed conditions at which the engine is approaching the limit of efficiency of its ignition devices, the ignition current may be greatly increased without detriment to the instrumentalities of the ignition system, even to a degree which if maintained when the engine was slowed down, would result in destruction of the current carrying or translating devices, and I have further found that when the current value is so augmented the limitational point of engine speed due to the ignition system is materially advanced. Thus in the embodiment of my invention I provide in conjunction with an internal combustion engine provided with sparking devices, suitable ignition circuits and devices proportioned to a predetermined current supply, and means for automatically augmenting or decreasing the current supply as the speed of the engine varies. Furthermore I prefer that the regulating devices shall be arranged to augment the current supply only at critical times which may be accurately predetermined, and that the variations shall be effected in a manner which will not interfere with the operation of the igniter.

In the accompanying drawing I have illustrated an embodiment of my invention in a conventional form, involving one ordinary type of ignition appliances, but it will be understood that such showing is illustrative merely, and that the teachings of my invention may readily be embodied, by those skilled in the art, to suit other types of ignition devices and to provide other means of current value regulation.

Figure 2:
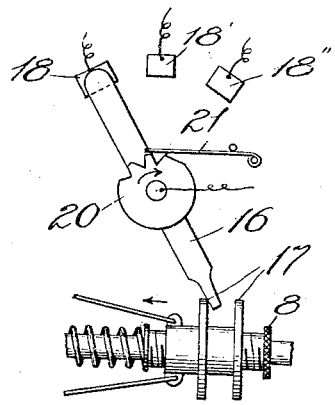

Figure 1 is a diagrammatic view of an engine and ignition system, showing an embodiment of my invention. Fig. 2 is a detail of the switching parts.

Throughout the drawing like numerals of reference refer always to like parts.

In the embodiment shown, 5 indicates in general an internal combustion engine provided with suitable sparking elements herein illustrated as a jump spark plug. With the engine at some suitable point is associated a speed-responsive governor, herein indicated in general at 7, as a ball type governor mounted upon a main shaft in the engine. The governor spring may preferably be adjusted and to this end the customary adjusting means for this type of governor is shown at 8. The type of ignition system generally shown comprises an induction coil 10, the secondary 11 of such induction coil being connected in circuit 12 with the sparking terminal 6, and the primary 13 of such coil being connected with the timing mechanism conventionally shown at 14 and with the source of current supply. The source of current supply may be varied in any suitable manner in response to change of speed of the engine, and in the embodiment shown I provide to this end a plurality of batteries 15, 15′ and 15″, connected in series and adapted to be cut into or out of the primary circuit in response to movements of the governor 7. To this end I provide in conjunction with the governor 7 a switch 16 having one end engaged by a pair of collars 17 constituting part of the equipment of governor 7 and its opposite end arranged to sweep over contacts 18, 18' and 18'' connected respectively with the terminals of batteries 15, 15' and 15'' remote from the timer 14, the switch blade being connected in the circuit wire 19 leading to the primary 13 of coil 10. It is my preference that the switch 16 shall be moved with a snap action, only at critical times, and to this end I show conventional snap switch mechanism, comprising a disk 20 with a suitable number of indentations, mounted upon the shaft which pivotally carries arm 16, and for coaction with said disk I provide a toothed spring detent 21, which engaging one of the several notches in the periphery of disk 20 will tend to hold it against movement until considerable force is applied thereto, and which will, when so moved spring the disk 20 and arm 16 forward with a snap action from one position to its position next in advance. I have found that in such an installation, assuming the coil to be wound for operation upon a predetermined voltage to be developed from the source of supply, and incapable of carrying any substantial increase in such voltage under normal conditions, the increase in voltage at periods when the engine has speeded up to a high degree produces no ill effect in the coil, while the augmentation of the ignition current supply enables proper sparking to be maintained at a speed higher than the critical or limitational speed of the engine under the first or normal conditions.

Having thus described my invention, what I claim and desire to secure by Letters Patent, is:

1. In an ignition system for internal combustion engines, the combination with an engine providing sparking appliances, of a suitable circuit breaker therefor, a plurality of battery cells connected in series relation with each other, and means comprising a switch and a governor, responsive to the speed of the engine for varying the number of cells in circuit to increase or decrease the electro-motive-force of the ignition current with the increase or decrease in speed of the engine.

2. The combination with an internal combustion engine providing ignition devices, an electric circuit, an electric battery comprising a series of cells adapted for connecton in the circuit, and means for varying the current consistent with variations in speed of the engine, comprising a snap switch and an engine-controlled governor for operating said switch in either direction to include a greater or less number of cells in circuit.

In testimony whereof I hereunto set my hand in the presence of two witnesses.

CHARLES B. ASKEW.

In the presence of—
FORÉE BAIN,
MARY F. ALLEN.